3,788,984
METHOD OF REMOVING OIL SPILLS

James Teng, St. Louis, James M. Lucas, Crestwood, and Richard E. Pyler, Shrewsbury, Mo., assignors to Anheuser-Busch, Incorporated, St. Louis, Mo.
No Drawing. Filed Jan. 24, 1972, Ser. No. 220,385
Int. Cl. C02b 9/02
U.S. Cl. 210—30            9 Claims

ABSTRACT OF THE DISCLOSURE

This disclosure covers a method of removing spilled oil from water surfaces without further injuring the environment, by applying a carbohydrate fatty acid ester in powder, fibrous, or granule form to the oil covered surface. The preferred ingredient is cellulose acetate. The additive is non-toxic, bio-degradable, water insoluble, and is not degraded by the acids in petroleum fuels. The additive is sprinkled on the surface of the oil coated water and after absorbing many times its weight in oil is easily removed. The picked up oil is easily removed from the cellulose acetate and up to 95% recovery of spilled oil is possible. The cellulose acetate also can be reused.

Cottonseed hulls and sawdust as the starting cellulose material are desirable because of low cost and the enhanced oil absorbing character of the resulting acetate.

REFERENCE TO OTHER APPLICATIONS

This application contains subject matter in common with applications filed of even date herewith as follows: Application of Stubits entitled Dry Cleaning Method Ser. No. 220,451; application of Stubits entitled Method of Absorbing Fats and Oils Ser. No. 220,392; application of Teng et al. entitled Lipophilic Cellulose Sponges Ser. No. 220,393; and previously filed pending applications of Teng et al. Ser. No. 845,067, filed July 25, 1969 (now abandoned); Ser. No. 154,219, filed June 17, 1971 issued on May 1, 1973 as U.S. Pat. No. 3,730,693; Ser. No. 106,882, filed Jan 15, 1971 issued on May 8, 1973 as U.S. Pat. No. 3,732,205; and Ser. No. 44,640, filed June 8, 1970 (now abandoned).

BACKGROUND OF THE INVENTION

Petroleum fuels spilled on navigable water ways from ships or shore installations pollute the environment and cause a potentially dangerous fire hazard. Rapid removal of the oil from the water is of great importance.

Various sorbents used in conjunction with booms have been used with moderate success in calm waters. Collecting the oil in open sea ways is much more difficult. Some of the agents described in "System Study of Oil Spill Cleanup Urocedures" vol. I, Dillingham Corporation, La Jolla, Calif., February 1970, are straw, shredded polyurethane foam Sorbent Type C, pine bark, surface treated talc, and Ekoperl. The most effective agent was straw.

Materials of high density and treated with lipophilic coating cause the oil to be sorbed and subsequently sink. The efficiency is limited. Disadvantage of the material is that the sea bottom becomes fouled so that bottom dwelling marine life in the area may be killed.

Chemical dispersants have been used to cause the oil to form small droplets. The oil is spread out allowing the natural rate of oxidation and biodegradation to be increased. The main disadvantage is that the chemicals used as dispersants exhibit great toxicity characteristics.

We found that the laurate and acetate derivatives of cellulose act as efficient sorption agents. Their maximum rate of sorbency of oil-on-water is 18 parts of oil to 1 part by weight of agent. The sorbent rapidly agglomerates the oil into a floating semi-solid mass. The solid is easily scooped from the surface of the water. It is easily pressed or filtered so that most of the oil and sorbent can be recovered.

Cellulose laurate and cellulose acetate are made from naturally occurring products. They are non-toxic, hydrophobic, degradable, water-insoluble and not degraded by acids in the petroleum fuels. The products of degradation, cellulose, lauric acid, and acetic acid, also are non-toxic and biologically degradable.

From the point of view of economics, cellulose acetate is by far the preferred material, because the starting material cost is substantially less and standard technology is available for manufacture of the product. Also, the reused oil pickup ratio for acetates is greater than for the corresponding laurates.

Raw cellulose, which may be obtained from many sources, may vary in purity, fiber characteristics, and molecular size. For example, raw wood pulp contains 40–50% cellulose, the remainder being mostly lignin and some hemicellulose, whereas raw cotton cellulose is almost completely free of contamination. The purification of raw cellulose is necessary in many applications and, naturally, adds to the cost of production. It has been found that purification is not necessary in the preparation of cellulose acetate oil pickup aids. Sawdust and cottonseed hulls are two sources of raw, unpurified cellulose which give a product with acceptably high oil pickup ratios.

SUMMARY OF THE INVENTION

This invention comprises a method for the sorption of crude oil on water which includes the steps of applying a cellulose acetate or cellulose laurate to the oil coated surface to coagulate the oil, picking up the mass, and recovering the oil from the cellulose ester so that the cellulose ester can be reused and the oil is saved.

DETAILED DESCRIPTION

The cellulose laurate has a degree of substitution (D.S.) of about 1.0 to about 2.9 while the cellulose acetate has a degree of substitution of about 0.1 to about 1.9. The preferred range for cellulose acetate is between 0.65 and 1.4. Overall the cellulose fatty acid ester D.S. can be between 0.1 and 2.9

Low D.S. cellulose acetates (D.S. values between 0.1 and 1.9) are able to sorb up to 15 times their weight of crude oil with an efficiency approaching that of cellulose laurate (95%). At D.S. levels below 0.1, the aceates are wetted by water and sink. At D.S. values above about 1.9, the fibrous structure of the gum is lost, consequently decreasing the oil pickup ratio. The optimal D.S. range is from 0.65 to 1.4 for cellulose acetate.

The D.S. is measured on a theoretical maximum of 3 and measures the substitution of the hydroxyl functions per monosaccharide unit with lipophilic units.

Cellulose acetate is non-toxic, hydrophobic, and biodegradable. The products of degradation, cellulose and acetic acid, are also non-toxic and biologically degradable.

Cellulose acetates were prepared by standard methods, using acetic anhydride and a perchloric acid catalyst. The products were white and fibrous, much like the original cellulose.

Cellulose laurate is prepared by the methods set forth in applications Ser. Nos. 845,067; 106,882, and 154,219, the disclosures of which are incorporated herein and made a part hereof.

The gum, applied at the rate of one part of gum to about 12 parts of oil, provides a lipophilic surface which sorbs the oil and forms a cohesive mas easily removed from the surface. The formation of a cohesive mass also prevents excessive spreading of the oil slick. It was found that the efficiency of sorption was approximately inversely proportional to the degree of substitution (D.S.) of the gum (i.e., the percentage of laurate residues in the gum) within certain limits.

The cost of cellulose laurate gum, even at low D.S. levels, at present would be prohibitive for large scale use in oil spill cleanup. Therefore, another aspect of the present invention is the use of cellulose acetate gums in the sorption of crude oil. The acetate derivative offers two major advantages. First, the cost of cellulose acetate gums is greatly reduced over that of the corresponding laurates and, second, the reused oil pickup ratio of the acetate is greater than that of the corresponding laurates. Minor advantages are the technology available for the production of acetate, the ready availability of low cost starting materials and the lack of need of close control of D.S. of the gum, since a wide range of levels produces comparable oil pickup values.

The amount of cellulose fatty acid esters used per square foot of surface area depends on the severity of the oil spill. The oil sorbed by the gum is about 10 to 20 grams per gram of gum and the amount of gum applied is determined by these two factors.

The recovery of the oil is greater than 95% of the amount spilled.

All of the cellulose esters pass through a 40 mesh screen and have a specific gravity of between 1.0 and 1.7. The temperature of the water and oil is between 0 and 30° C. The particles of ester must be left on the surface for 1 to 3 minutes to clump the oil. The particles have about 0% to 3% moisture content when ready for use. These cellulose esters can be used in both fresh and salt water.

The preferred starting cellulosic materials are cottonseed hulls and sawdust. The cost of these is low and the oil pickup ratio is high, particularly with cottonseed hulls.

Other sources of raw cellulose which might be used include agricultural waste products such as cottonseed hulls, ground corn cobs, wheat straw, etc., and also waste paper such as newsprint, etc.

Cottonseeds consist of a hull and a kernel, the former consisting of cellulosic and hemicellulosic material, the latter containing most of the valuable oil. The hull material is a by-product of oil production and its hemicelluloses have been used as a source of xylose. The material used in Example No. VI had been freed of its hemicellulose by extraction, but the whole material also performs similarly.

The degree of substitution of the acetate of the cellulosic cottonseed hulls is the same as for the cellulose acetates previously mentioned. The average fiber length of the cottonseed hull cellulose acetate is between 2 and 15 mm. The oil pickup ratio (g. oil/g. cellulose acetate) is between 14 and 20 for spilled oils of different specific gravities. The untreated cottonseed hulls have an oil pickup ratio of 3/1 to 4/1.

Following are specific examples of this invention.

EXAMPLE NO. I

Cellulose acetate of D.S.=1.4 is sprinkled on the surface of crude oil floating on water at the rate of 1 g. of gum of 15 g. of oil. The oil-water system is gently agitated during the addition. Oil sorption is effected almost immediately to form a coherent mass which can be scooped easily from the surface.

The oil-bearing mass is removed to a filter and the adhering oil is removed using kerosene (JP-4) as a solvent. The semi-moist gum is reapplied to the surface of crude oil floating on water at the rate of 1 g. gum to 6.2 g. of crude oil. This reused pickup ratio of 6.2 g. oil/g. gum is somewhat better than that reported for the laurate gum.

EXAMPLE NO. II

Oil-bearing gum, obtained as in Example No. I is filtered and washed thoroughly with kerosene. The brown, fibrous material is then air dried or oven dried and is again applied to the surface of oil floating on water as before. The oil pickup ratio of the material shows an increase to between 20 and 40.

EXAMPLE NO. III

Cellulose acetate gums of varying D.S. levels are sprinkled on floating crude oil as described in Example No. I. The sorption ratio and D.S. level of each is given below.

TABLE NO. I

| Number | D.S. | Sorption ratio (g. oil/g. gum) |
|---|---|---|
| 660-152-1 | 0.10 | 8.6 |
| 660-183-1 | 0.65 | 11.0 |
| 660-165-1 | 0.95 | 10.4 |
| 660-129-1 | 1.3 | 11.8 |
| 660-183-2 | 1.4 | 15.0 |
| 660-164-1 | 1.9 | 7.2 |

The foregoing cellulose acetate gums are made by reacting cellulose with acetic anhydride in the presence of perchloric acid for 2–5 minutes at 0–5° C. This process is described in more detail in Methods in Carbohydrate Chemistry, vol. III, R. L. Whistler, Ed., Academic Press, 1963.

EXAMPLE NO. IV

Cellulose laurate, D.S. 1.4, is sprinkled on the surface of floating crude oil on water at the rate of 1.0 g. of sorbent to 12 g. of oil with a gentle wave-like agitation. The oil is sorbed within 5 minutes. The semi-solid mass is scooped easily from the water. The oil can be recovered by pressing the entire mass at 10 p.s.i.g. In the laboratory, this operation is easily carried out on a Buchner funnel. The cellulose laurate residue after oil recovery is washed twice with 20 ml. portions of a hydrocarbon solvent, e.g., hexane, and air dried. The weight of the residue increases about 1.5 times. It is reused to sorb oil at the rate of 1.0 g. of sorbent to 1.4 g. of oil. The sorbent is reused several times without changing the rate of sorption. The collected oil from the filtering process and the washings are combined and the water and hexane are distilled. The oil is recovered in near quantitative yields, i.e., about 95%.

EXAMPLE NO. V

Cellulose laurates of different D.S. were added to oil-on-water as described in Example No. IV. The initial rate of sorption was correlated with their D.S.

| D.S. | Sorption rate g. of oil sorbed 1.0 g. of agent |
|---|---|
| 1.4 | 12 |
| 1.8 | 8 |
| 1.9 | 6 |
| 2.4 | 6 |
| 2.5 | 4 |
| 2.7 | 4 |
| 2.8 | 4 |

EXAMPLE NO. VI

Cottonseed hull cellulose (10 g.) of 2 to 15 mm. size is activated by treatment with 150 ml. deionized water, filtration, and three treatments with 150 ml. glacial acetic acid, each such treatment being followed by filtration. The wet residue is dispersed in xylene (100 ml.) containing glacial acetic acid (80 ml.) at 0° C., and the mixture is cooled to 0° C. Perchloric acid (0.5 ml., 72%) is added and thoroughly dispersed; then cooled acetic anhydride (60 ml.) is added and the suspension is shaken at 0° C. for 3 minutes. After rapid filtration through sintered glass, the residue is washed twice with acetic acid and three times with methanol and air dried. The residue (9.1 g.) was physically unchanged by the treatment. The degree of substitution, by saponification, is 0.59 acetyl groups per anhydroglucose unit. The fiber length is 2 to 15 mm. and the specific gravity is 1.0–1.7.

The oil pickup ratio (g. oil/g. cellulose acetate) of this product ranges from 14 to 20 for a series of oils of different specific gravities.

EXAMPLE NO. VII

Sawdust (10 g.) of 40 mesh size is activated and acetylated as described in Example VI. The degree of substitution, by saponification, is 0.98 and the oil pickup ratio is 8.8. The specific gravity is 0.3–0.9 and the material passes a 40 mesh screen.

What is claimed is:

1. A method of removing oil from the surface of water including the steps of applying a cellulose ester selected from the group consisting of cellulose acetate of D.S. of about 0.1 to about 1.9. and cellulose laurate of D.S. of about 1.4 to about 2.9 to an oil covered surface of water to cause the coagulating of the oil into clumps, removing the oil coated ester, and separating the oil from the ester.

2. The method of claim 1 wherein the cellulose ester is cellulose acetate.

3. The method of claim 1 wherein the cellulose ester is cellulose laurate.

4. The method of claim 1 wherein the oil is removed at the rate of 10 to 30 grams/gram of cellulose ester.

5. The method of claim 1 wherein at least 95% of the oil is recovered from the ester.

6. The method of claim 1 including the step of reusing the ester at least 3 times.

7. The method of claim 2 wherein the cellulose acetate is derived from cottonseed hulls.

8. The method of claim 2 wherein the cellulose acetate is derived from sawdust.

9. The method of claim 7 wherein the size of the cellulose acetate fibers is 2 to 15 mm. and the specific gravity is 1.0 to 1.7.

References Cited

UNITED STATES PATENTS

| | | | |
|---|---|---|---|
| 3,607,741 | 9/1971 | Sohnius | 210—40 X |
| 3,689,406 | 9/1972 | Ohta | 210—40 X |
| 3,352,778 | 11/1967 | Brink et al. | 210—Dig. 21 |
| 3,479,336 | 11/1969 | Taylor et al. | 260—227 X |
| 1,742,611 | 1/1930 | Miles et al. | 260—227 |

OTHER REFERENCES

Malm, C. J. et al.: "Aliphatic Acid Esters of Cellulose," Ind. and Eng. Chem. 43:684 (March 1951).

SAMIH N. ZAHARNA, Primary Examiner

T. G. WYSE, Assistant Examiner

U.S. Cl. X.R.

210—40, Dig. 21